Dec. 10, 1940.   I. FLORMAN   2,224,259
TOILET DEVICE
Original Filed Nov. 3, 1938
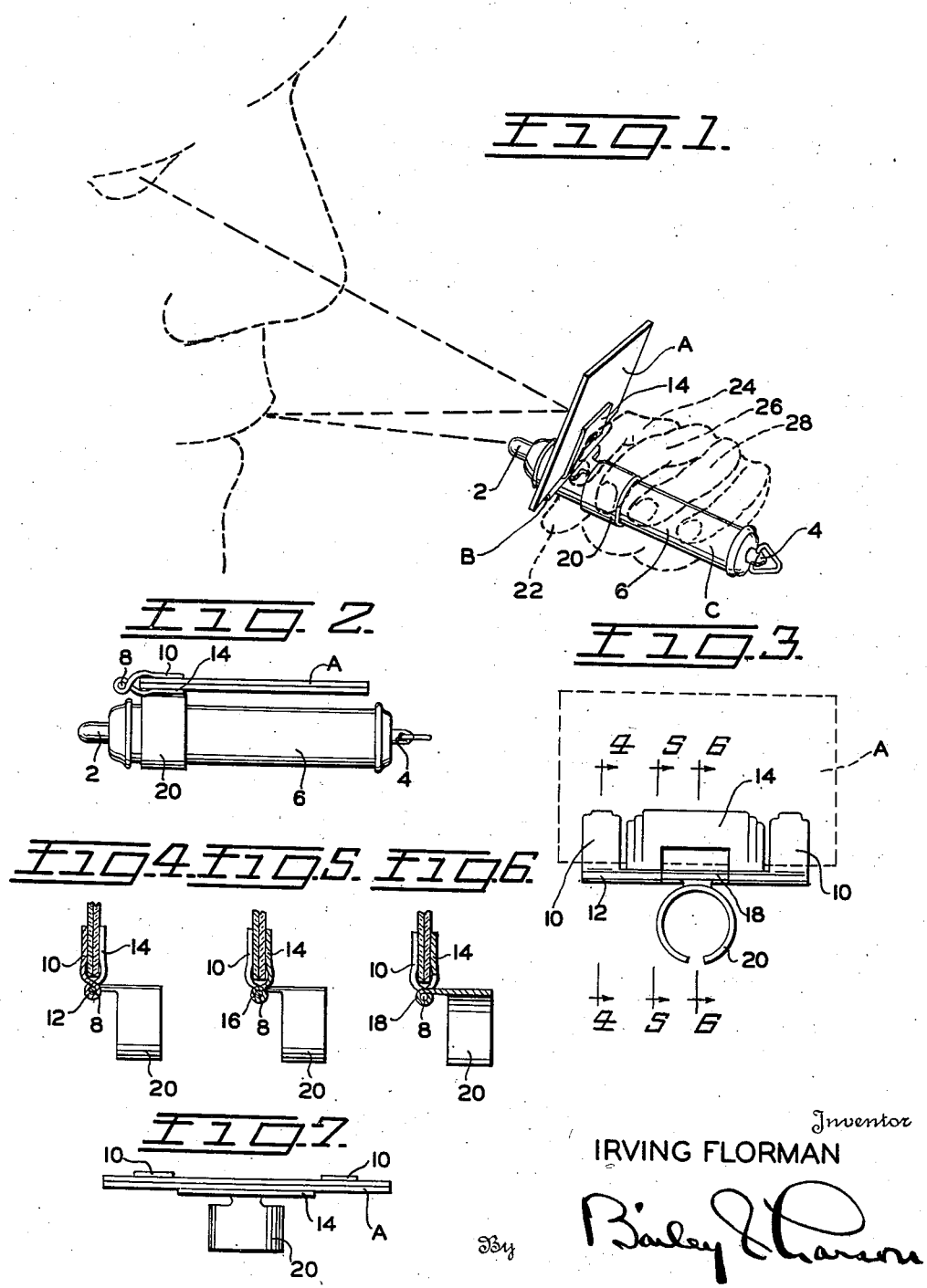
Inventor
IRVING FLORMAN Patented Dec. 10, 1940

2,224,259

UNITED STATES PATENT OFFICE 2,224,259

TOILET DEVICE

Irving Florman, New York, N. Y.

Application November 3, 1938, Serial No. 238,687
Renewed May 3, 1940

2 Claims. (Cl. 240—4.2)

My invention relates to toilet devices, and more particularly to an arrangement combining a mirror with a flashlight or other device.

The primary object of the invention is to provide a mirror-holding device which is simple and inexpensive, but which makes it easy for anyone wishing to use a small pocket mirror to hold the same in a proper position to see any part of the face. A further object of the invention is to provide a mirror-holding structure which may be utilized in combination with some other arrangement, such as a flashlight, in which the additional arrangement serves as a handle by which the mirror may be manipulated.

Another purpose of the invention is to arrange this handle in such a manner that it is easy for a person holding the mirror thereby to arrange the angle of the mirror by the same fingers which are utilized to grip the auxiliary arrangement.

Still another object of the invention is to provide a flashlight as this auxiliary arrangement, so that the angle of the mirror with respect to the flashlight may be modified. In this manner it is possible to throw the light on different parts of the face while still viewing the illuminated part in the mirror.

A further purpose of the invention is to provide an arrangement which is useful, and handy, and yet which is quite compact. This is produced by providing means to permit the flashlight or other holding device to fold against the back of the mirror, so that the combined structure occupies but little space when in this folded condition.

Further objects and advantages of the invention will appear more fully from the accompanying drawing, which forms a part thereof:

In the drawing:

Fig. 1 shows the device as it is intended to be utilized, particularly when combined with a flashlight;

Fig. 2 shows in side elevation the device in folded condition;

Fig. 3 is a front view of the mirror-holding arrangement;

Figs. 4, 5 and 6 are cross sections on the lines 4—4, 5—5 and 6—6 respectively of Fig. 3;

Fig. 7 is a plan view of Fig. 3.

The device in general as shown in the drawing comprises a mirror A, a holding device B and a flashlight or other arrangement C. Where a flashlight is used, it may be, for instance, of the type shown in my Patent No. 2,180,228, granted Nov. 14, 1939, having a bulb at 2 and a control member at 4 which, upon turning, causes illumination of the bulb. The body 6 is of cylindrical shape.

The mirror-holding device B is shown in detail in Figs. 3 to 7. It is composed of two parts of resilient metal mounted for relative turning movement on a pin or shaft 8, which extends the whole length of the device. The mirror-holding section comprises at each end upstanding tongues 10 which are bent as at 12 (Fig. 4) around the pin 8. This bent-around portion is continued to the center, and integral with it is the central tongue 14, the end of which is bent around the pin as at 16 (Fig. 5), but in the opposite direction from portion 12. The two tongues 10 and the tongue 14 extend away from the pin 8 in different lines, and are then bent inwardly towards each other, as is clearly apparent from Figs. 4 to 6. When a mirror A is slid between tongue 14 and tongues 10, with tongue 14 gripping the back of the mirror and tongues 10 the front, the mirror will be securely held.

The pin 8 is preferably made rigid with the tongues 10 and 14 by clamping the portions 12 and 16 tightly on the pin. Also clamped around the pin, but turnable with respect thereto, preferably with a considerable amount of friction, is an extension 18 of a resilient split cylindrical holding member 20. A flashlight such as C or any other device may be frictionally gripped by the split cylindrical portion 20.

When the device is not in use, it may be folded into the position shown in Fig. 2, with the flashlight C extending parallel with the mirror A. Under these conditions the device obviously occupies relatively little room in the pocketbook of the user. In this position, the split cylindrical holder 20 lies adjacent the intermediate ear 14, and its axis is substantially parallel to the direction in which ear 14 projects from pin 8.

When the device is in use, it is held in one hand or the other in the manner shown in Fig. 1. The thumb 22 grips the lower side of the flashlight, and at least three of the fingers 24, 26 and 28 grip the upper part. The fore finger 24 is held just behind the tongue 14. By pushing the fore finger slightly forward, it is possible to vary somewhat the angular position of the mirror with respect to the flashlight. It is thus easy to vary the portion of the face shown in the mirror, with respect to the flashlight, so that the illuminated portion of the face may be brought into view in the mirror. This is indicated by the dot and dash lines in Fig. 1, which represent the path of light from the flashlight to the face, to the mirror, and thence to the eyes of the user.

While the above description discloses the use of a flashlight as the holding member, it is obvious that other articles of small size, such as a lipstick, or the like, might be used also.

While I have described herein one embodiment of my invention, I wish it to be understood that I do not intend to limit myself thereby except within the scope of the appended claims.

I claim:

1. In combination, a mirror-holding means, a flashlight-holding means, and means pivoting said flashlight-holding means on said mirror-holding means to turn with respect thereto about an axis perpendicular to the longitudinal axis of a flashlight held thereby, said flashlight-holding means being capable of movement to a position in which the flashlight lies against the rear face of and parallel to the mirror, and to another position in which the flashlight illuminates the face when reflected in the said mirror.

2. In combination, a mirror-holding means, a flashlight-holding means, and means pivoting said flashlight-holding means on said mirror-holding means to turn with respect thereto about an axis perpendicular to the longitudinal axis of a flashlight held thereby and located along one edge of a mirror held by said mirror-holding means, said flashlight-holding means being capable of movement to a position in which the flashlight lies against the rear face of and parallel to the mirror, and to another position in which the flashlight illuminates the face when reflected in the said mirror.

IRVING FLORMAN.